Aug. 6, 1946.  E. F. GINGRAS  2,405,496
DRIVING BELT
Filed April 22, 1942
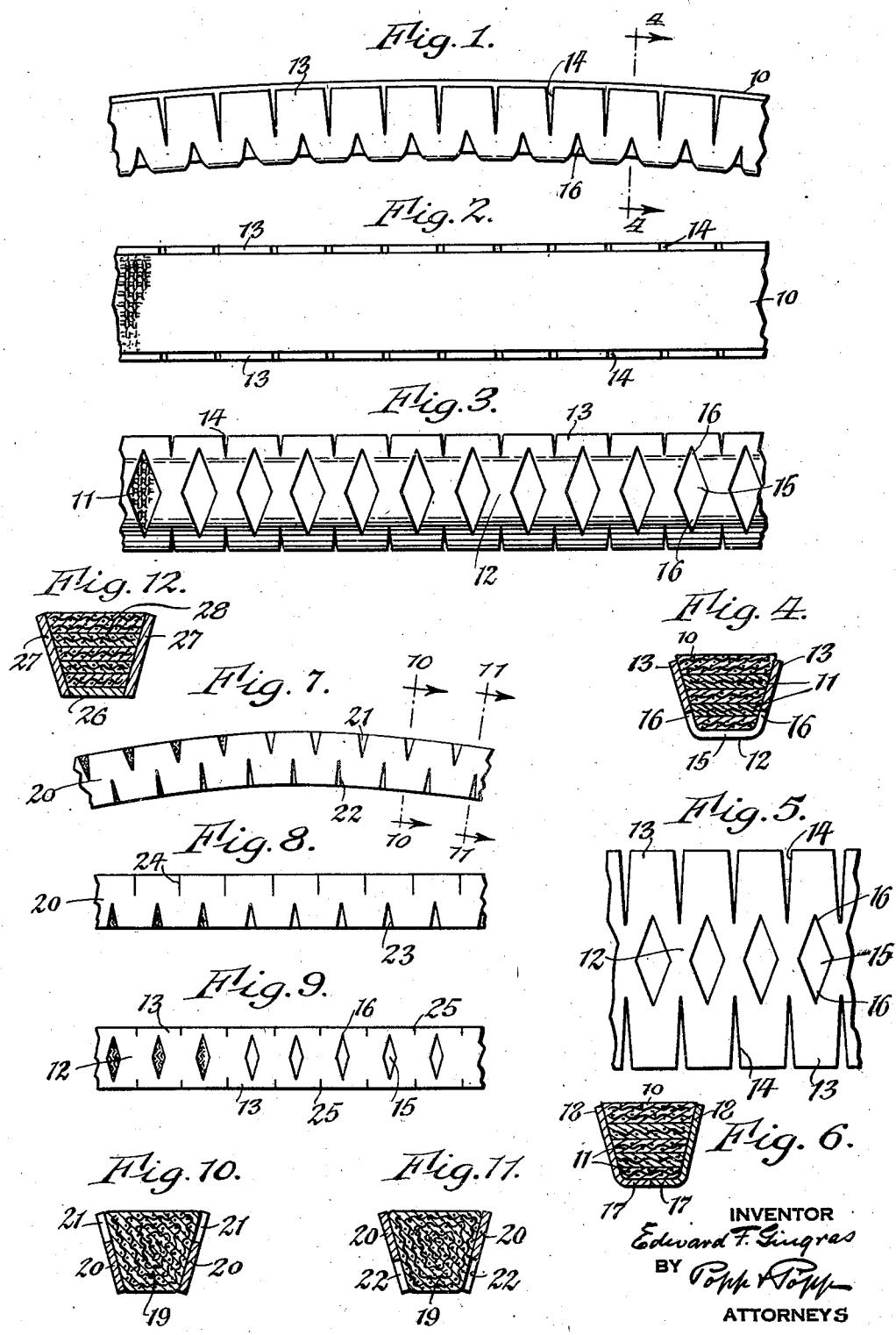
INVENTOR
Edward F. Gingras
BY
ATTORNEYS Patented Aug. 6, 1946

2,405,496

UNITED STATES PATENT OFFICE 2,405,496

DRIVING BELT

Edward F. Gingras, Buffalo, N. Y.

Application April 22, 1942, Serial No. 440,003

1 Claim. (Cl. 74—233)

This invention relates to driving belts for transmitting power or motion from one wheel or pulley to another and more particularly to a driving belt which engages with a V-shaped groove in the periphery of the wheels or pulleys on which the same is mounted.

Belts of this type, as heretofore constructed, generally consisted of a longitudinal pliable body made of laminated woven or braided cotton treated with rubber or other cementitious filler. This construction is objectionable when the belt runs in the peripheral V-shaped grooves of pulleys because the body of the belt becomes tightly wedged in these grooves and requires considerable effort to disengage the belt from these grooves with the result that a substantial amount of power is lost and the efficiency of the transmitting means reduced accordingly.

It is the object of this invention to provide a pliable driving belt of this character which runs in the grooves of pulleys and effectively transmits power from one to the other without liability of the belt adhering or clinging tenaciously to the walls of the grooves but instead separating freely therefrom and thus insuring transmission of a greater amount of power. With this end in view this invention consists in providing the bearing portions or faces of the driving belt with a driving cover of leather or other non-sticking material which enables the belt to obtain a firm grip on the periphery of the pulleys and yet permits the same to readily free itself from the pulleys while in operation without any appreciable retarding effect.

In the accompanying drawing:

Fig. 1 is a fragmentary side elevation of a driving belt embodying one form of this invention, and showing the belt slightly bent.

Fig. 2 is a top plan view of the same.

Fig. 3 is a bottom plan view thereof.

Fig. 4 is a cross section of the same, taken on line 4—4, Fig. 1.

Fig. 5 is a fragmentary plan view of the driving cover shown in Figs. 1–4 in a flattened form.

Fig. 6 is a cross section similar to Fig. 4, but showing a modified form of the driving cover.

Fig. 7 is a fragmentary side elevation of another modified form of this improved driving belt showing the same slightly bent.

Fig. 8 is a side view of the same in a straight condition.

Fig. 9 is a plan view of the cover similar to Fig. 5 but showing the notches formed in the edges by slitting instead of removing material.

Figs. 10 and 11 are transverse sections of the same, on an enlarged scale, taken on the correspondingly numbered lines in Fig. 7.

Fig. 12 is a cross section similar to Figs. 4, 6, 10 and 11 showing another modified form of this invention.

In the following description similar reference characters indicate like parts in the several figures of the drawing.

In general this driving belt comprises a longitudinal body constructed of pliable material, such as cotton, and a driving cover mounted on those parts of this body which are pressed toward the periphery of the pulleys around which the belt passes and from one of which power or motion is transmitted to the other by this belt. The body shown in Figs. 4 and 6 comprises a plurality of longitudinal laminations, layers or strips 10, 11 of woven cotton which are superposed and connected with each other by rubber cement or similar cementitious material, the outermost layer 10 being comparatively thick and the remaining layers 11 on the inner side of the outer layer being relatively thin, as shown in Fig. 4. When this belt is to be used on pulleys or wheels having peripheral grooves of V-shaped cross section for the reception of the belt then the body of the belt is made of corresponding cross section, as shown in Fig. 4, to fit the bottom and side walls of these grooves, but if the grooves of the pulleys intended to receive the belt are of different shape then the belt is made of like form in cross section.

In the absence of any covering or facing on the circumferential inner side and the opposite radial sides of this body the rubber cement which is applied to these strips or layers and which is exposed on the external surface of the same causes the inner parts of this belt when drawn into the grooves of the pulleys cooperating therewith to grip the same unduly tight and to such an extent that the subsequent removal of the belt from the pulleys is resisted unduly by the clinging or sticking of the belt to the working surfaces of the pulleys which are contacted by the belt, thereby causing a substantial loss of power which otherwise would be transmitted. For the purpose of enabling the belt to obtain a firm grip on the pulleys and still permit the same to freely disengage itself therefrom for minimizing the loss of power, the inner bearing part of the belt body is provided with a driving cover or facing which is interposed between the cement coated surfaces of the body and the working surfaces of the pulleys, which facing or covering prevents the cement from exerting any sticking effect but instead permits the belt to move freely into and out of engagement with the working surfaces of the pulleys around which the belt passes. Although this covering or facing may be constructed of various pliable materials it is preferable to make the same of leather in the form of a longitudinal strip, the inner side of which is cemented to the inner surfaces of the belt body and the outer side of the same being movable into and out of engagement with the working surfaces of the pulleys.

In the preferred construction this driving cover strip is made integrally of U-shaped form in cross section and comprises an inner cylindrical web 12 which is secured to the inner circumferential side of the belt body and two outwardly diverging radial flanges or walls 13 which are secured to the opposite lateral or radial sides of the belt body, as best shown in Fig. 4. The connection between this cover or facing and the body is preferably effected by a suitable cement.

When a belt having a pliable body equipped with a cover or facing of leather in this manner passes around the working surfaces of pulleys the leather cover grips the pulleys firmly and transmits power from the driving pulley to the driven pulley but the leather cover moves readily into and out of engagement with the working surfaces of the pulleys so that no appreciable amount of power is lost.

In order to permit the cover of the belt to readily adapt itself to the curvature of the working surfaces of the pulleys the same is provided with notches so that the outer and inner parts of the cover are permitted to move lengthwise relative to one another as the belt is alternately curved and straightened when its parts constitute the active bights which engage the pulleys and the idle stretches which are out of engagement from the pulleys.

For this purpose it is preferable to provide the outer edges of the flanges of the cover with a plurality of outer notches 14 which are arranged in a longitudinal row at suitable intervals on these flanges so that these parts of the cover will contract and close the outer notches more or less while the belt is in a straightened condition and expand and open these notches accordingly while the belt passes around the curved peripheries of the pulleys. The inner part of the cover is also provided with a plurality of inner closed notches or openings which are arranged in a longitudinal row at intervals on the respective part of the cover so that the same can expand for opening these inner notches while the belt is straight and contract for closing these notches while the belt is curved.

These inner notches preferably alternate with the outer notches so that the rows of inner and outer notches are staggered relative to one another, as shown in Fig. 1, and thus permit of making the notches deeper and also enable the inner and outer rows of notches to overlap without appreciably weakening the cover.

Although the inner notches may be variously constructed each of the same is represented in Figs. 1, 3 and 5 as consisting of an opening formed in the inner part of the cover and having its central part 15 formed solely in the web 12 of the cover while the opposite ends 16 of this opening extend upwardly from the web into the lower parts of the flanges 13 of the same. Each of these openings is also preferably of diamond shape, the wide central part being formed in the web of the cover and the narrow tapering ends in the flanges of the same, as shown in Fig. 3, thereby rendering the belt more resilient on its inner side than on its outer side. The inner and outer notches in this integral cover may be readily and easily formed therein while the facing is arranged in a flattened position, as shown in Fig. 5, thereby facilitating its manufacture at a reasonable cost.

This driving cover not only conceals and protects the cement surfaces of the body to prevent the same from adhering too firmly against the working surfaces of the pulleys, but the same also serves as a facing or binder for the edges of the layers comprising the body of the belt and protects the same against wearing, loosening, fraying or disintegrating.

Instead of making the driving cover of the belt of one piece of pliable material, as shown in Figs. 1-5, the same may be constructed of two longitudinal strips or sections, each of which is of L-shape in cross section and includes an inner web flange 17 secured to the inner side of the belt body and covering one-half the width thereof and a side flange or wall 18 projecting radially outward from the outer edge of the web flange 17 and secured to the respective radial side of the body by cement or otherwise. The inner edges of the web flanges 17 of the two cover sections oppose each other so that the same together form a driving cover which is U-shaped in cross section, as shown in Fig. 6.

If desired the body of the driving belt may be constructed of cotton or other pliable material which is braided in the form of a cord, as shown at 19 in Figs. 10 and 11.

Instead of making the driving cover U-shaped in cross section and extending the same across the inner side of the body, this cover may be composed of two separate strips or walls 20, 20 of leather, or the like, which are secured only to the opposite radial sides of the body, as shown in Figs. 7, 8, 10 and 11. In Figs. 1-5 the outer open notches 14 of the flanges 13 are formed by actually removing material from the edge portions of the flanges of the U-shaped cover, in Figs. 7, 10 and 11 the outer and inner notches 21, 22 of the separate cover strips 20 are also formed by cutting out material from the outer and inner edge portions of the strips 20, but in Fig. 8 the inner closed notches 23 or openings are formed in each of the cover strips by cutting out material therefrom and the outer open notches are formed by merely slitting the edge portion of the strip, as shown at 24. In Fig. 9 the notches at the upper edges of the flanges of the integral cover are formed by slitting the respective parts, as shown at 25.

If desired the driving cover for the belt body may be made in three sections, an inner web section 26 secured by cement or the like to the inner circumferential side of the body and two outer flange sections or walls 27 secured in like manner to the opposite sides of the body 28 and the opposite edges of the inner web section 26, as shown in Fig. 12.

In the several forms of this invention the lateral sides of the body of the belt are flush with the inner sides of the notches that are formed on the inner and outer parts of the side walls, thereby forming air pockets or recesses on the respective parts of these walls, whereby those parts of these walls on circumferentially opposite edges of each of these pockets are capable of moving toward and from each other as the belt is bent into and out of curved form while passing around the grooved periphery of a pulley. By thus arranging the lateral sides of the belt body flush with the inner sides of these pockets the side parts of the body will not be squeezed outwardly into these pockets and interfere with the contraction of each of the same.

If any part of the body were permitted to project laterally outward into these pockets such parts of the body would be repeatedly squeezed and then released by the opposing walls of these pockets and this would not only cause the belt to become unduly heated but also impair its efficiency.

The absence of any material in the pockets of the side walls of the belt also causes air trapped in the same to produce a cooling effect on the belt and thereby reduces to a minimum any heating action on the belt when bending the same, particularly when the body of the belt is made up partly of rubber containing sulphur.

All of the several forms of this invention can be manufactured at low cost in accordance with standard methods now in general use, thereby enabling considerable economy to be effected in the installation and maintenance of belting of this character.

I claim as my invention:

A driving belt comprising a pliable longitudinal continuous body having an outer side, an inner side and two lateral sides, and a pliable covering including two continuous side walls secured to the lateral sides of the body and each of these walls having its outer part provided with a longitudinal row of notches and having its inner part provided with a longitudinal row of notches, the lateral sides of said body being flush with the inner sides of said notches, the inner and outer notches of each wall being staggered relative to one another, and said notches containing no solid material and forming air pockets whereby the respective side edges of each of said notches are permitted to move freely toward and from each other and heating of the belt is minimized as the same passes on and off the grooved periphery of a pulley.

EDWARD F. GINGRAS.